(12) United States Patent
Campbell

(10) Patent No.: US 12,168,505 B2
(45) Date of Patent: Dec. 17, 2024

(54) SEPARATING DOOR VENTING FUNCTIONS ISOLATING MEANS TO PREVENT PRESSURIZATION AND HANDLE LOCKOUT DUE TO HIGH CABIN PRESSURE

(71) Applicant: The Boeing Company, Chicago, IL (US)

(72) Inventor: Leanne Campbell, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 55 days.

(21) Appl. No.: 18/145,439

(22) Filed: Dec. 22, 2022

(65) Prior Publication Data

US 2024/0208634 A1 Jun. 27, 2024

(51) Int. Cl.
*B64C 1/14* (2006.01)
*B64D 13/02* (2006.01)

(52) U.S. Cl.
CPC .............. *B64C 1/143* (2013.01); *B64D 13/02* (2013.01)

(58) Field of Classification Search
CPC .... B64C 2001/009; B64C 13/02; B64C 1/143
See application file for complete search history.

(56) References Cited

U.S. PATENT DOCUMENTS

| | | |
|---|---|---|
| 4,473,201 A | 9/1984 | Barnes et al. |
| 5,305,969 A | 4/1994 | Odell et al. |
| 5,337,977 A | 8/1994 | Fleming et al. |
| 5,823,473 A | 10/1998 | Odell et al. |
| 5,931,415 A | 8/1999 | Lingard et al. |
| 6,454,210 B1 | 9/2002 | Plattner |
| 8,201,777 B2 | 6/2012 | Wilson et al. |
| 8,298,055 B2 | 10/2012 | Schiek |
| 8,991,761 B2 | 3/2015 | Pritzen et al. |

(Continued)

FOREIGN PATENT DOCUMENTS

| | | |
|---|---|---|
| CN | 1082003 C | 4/2002 |
| FR | 2686568 A1 | 7/1993 |

(Continued)

OTHER PUBLICATIONS

Extended European Search Report, Application No. 23212497.4, Dated Jun. 6, 2024, Five Pages.

*Primary Examiner* — Richard Green
*Assistant Examiner* — Ashesh Dangol
(74) *Attorney, Agent, or Firm* — Jordan IP Law, LLC

(57) ABSTRACT

Systems, apparatuses and methods provides for technology that moves a locking vent door from an opening position to a locking position, where in the opening position, the locking vent door opens a locking vent, and in the locking position, the locking vent door closes the locking vent. When the locking vent door is in the locking position, the technology prohibits movement of a handle from an engaged position to a disengaged position. When the locking vent door is in the opening position the technology moves the handle from the engaged position to the disengaged position, moves a lock from a locking position to an unlocking position, and moves a pressurization vent door from the pressurization position to the depressurization position based on the lock being moved from the locking position to the unlocking position.

20 Claims, 13 Drawing Sheets

(56) References Cited

U.S. PATENT DOCUMENTS

| | | |
|---|---|---|
| 10,752,331 B2 | 8/2020 | Bessettes et al. |
| 2006/0006285 A1 | 1/2006 | Puschmann et al. |
| 2011/0049299 A1* | 3/2011 | Gowing .................. B64C 1/143 |
| | | 244/129.5 |
| 2013/0327892 A1 | 12/2013 | Gowing et al. |
| 2019/0063116 A1* | 2/2019 | Zou ......................... E05B 79/20 |
| 2022/0126974 A1 | 4/2022 | Louvel et al. |
| 2022/0135201 A1 | 5/2022 | Mortland |

FOREIGN PATENT DOCUMENTS

| | | |
|---|---|---|
| FR | 3043059 B1 | 12/2018 |
| WO | 2020182766 A1 | 9/2020 |
| WO | 2021165896 A1 | 8/2021 |

\* cited by examiner

SEPARATING DOOR VENTING FUNCTIONS ISOLATING MEANS TO PREVENT PRESSURIZATION AND HANDLE LOCKOUT DUE TO HIGH CABIN PRESSURE

FIELD

Examples generally relate to a venting door pressurization mechanism to control pressurization and depressurization of an aircraft. More particularly, examples relate to vent doors that permit pressurization when in a closed position, prevent depressurization when a pressurization differential meets a threshold, and permit depressurization when the pressurization differential does not meet the threshold.

BACKGROUND

An aircraft cabin can be pressurized during operation. Cabin pressurization may offset differences between low-altitude and high-altitude air density. That is, air is less dense at high altitudes than at low altitudes, resulting in air pressure imbalances between low-altitude and high-altitude. The per square inch (PSI) differences between low-altitude and high-altitude air density can exceed 10 PSI.

Low air pressure associated with high-altitude flights can restrict passengers from receiving an adequate amount of oxygen. Thus, aircraft cabins are typically pressurized to ensure that passengers are able to receive the adequate amount of oxygen and prevent unfavorable conditions such as hypoxia. That is, the low air pressure at higher altitudes results in the density of air being less and containing less oxygen. As such, pressurization is required so that the air density increases leading to people receiving sufficient oxygen.

SUMMARY

In accordance with one or more examples, provided is an aircraft comprising a pressurization vent door that is moveable between a pressurization position to close a depressurization vent to allow the aircraft to be pressurized, and a depressurization position to open the depressurization vent to depressurize the aircraft. The aircraft includes a locking vent door that when moved to be open in an opening position opens a lockout vent, and when moved to be closed in a closing position closes the lockout vent. The aircraft includes a handle that controls the pressurization vent door and is moveable to an engaged position to control the pressurization vent door to be in the pressurization position, and a disengaged position to control the pressurization vent door to be in the depressurization position, the handle being releasably connected with the locking vent door. The handle is releasably connected with the locking vent door so that when the locking vent door is in the closing position, the handle is secured in the engaged position so that the handle is prevented from moving into the disengaged position, and when the locking vent door is in the opening position, the handle is moveable to the disengaged position to permit the pressurization vent door to be in the depressurization position.

In accordance with one or more examples, a method comprising moving a locking vent door from an opening position to a closing position, wherein in the opening position, the locking vent door opens a lockout vent, and in the closing position, the locking vent door closes the lockout vent. The method comprises when the locking vent door is in the closing position, prohibiting movement of a handle from an engaged position to a disengaged position. The method comprises when the locking vent door is in the opening position, moving the handle from the engaged position to the disengaged position to permit a pressurization vent door to be in a depressurization position, and moving the pressurization vent door from a pressurization position to the depressurization position based on the handle being moved from the engaged position to the disengaged position, wherein in the pressurization position the pressurization vent door closes a depressurization vent, and in the depressurization position the pressurization vent door opens the depressurization vent to depressurize an aircraft.

The features, functions, and advantages that have been discussed can be achieved independently in various examples or can be combined in yet other examples further details of which can be seen with reference to the following description and drawings.

BRIEF DESCRIPTION OF THE DRAWINGS

The various advantages of the examples will become apparent to one skilled in the art by reading the following specification and appended claims, and by referencing the following drawings, in which:

DESCRIPTION

Figure 1:
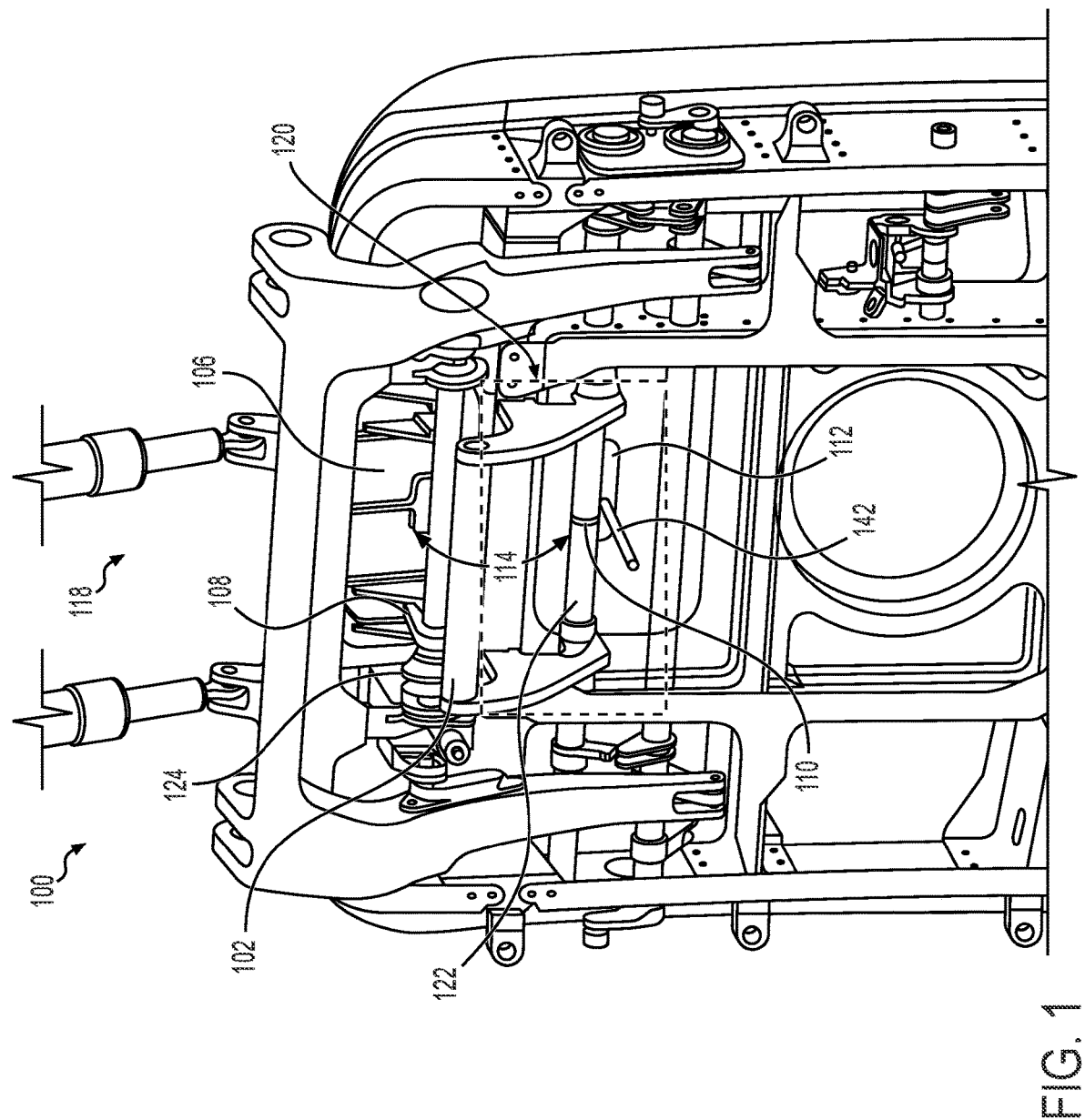
FIG. 1 is an illustration of an example of aircraft door.

Turning now to FIG. 1, an aircraft door 100 is illustrated. The aircraft door 100 is part of an aircraft that can seal or open an entry/exit into the aircraft. For example, the aircraft door 100 is moveable to a first position to permit a user to enter or exit the aircraft, and a second position to seal the aircraft and disallow the user from entering or exiting the aircraft. The aircraft door 100 includes an aircraft pressurization system 118 that comprises a pressurization vent door 106 and a locking vent door 112. The aircraft pressurization system 118 is configured to allow pressurization in a first configuration and prevent pressurization in a second configuration to enhance safety and comply with certain regulations. For example, the aircraft pressurization system 118 separates the locking vent door 112 (e.g., a means to pressure lock), and the pressurization vent door 106 (e.g., a means of preventing pressurization of the aircraft). As will be explained in further detail, the separation of the pressurization vent door 106 and the locking vent door 112 can provide enhanced operations including flexible positioning and safety. Furthermore, some examples can lock a handle 102 and prevent opening of vent(s) (e.g., depressurization vent) on the ground when there is a pressure differential that could cause damage to interior parts of an aircraft (e.g., door, electronic components, etc.), and/or potential injury.

The pressurization vent door 106 is moveable between a pressurization position to close a depressurization vent to allow the aircraft to be pressurized, and a depressurization position to open the depressurization vent to depressurize the aircraft. The pressurization vent door 106 can be biased via a biasing mechanism (e.g., springs) towards the depressurization position (e.g., opens the depressurization vent). As described below, the pressurization vent door 106 is interlocked with the locking vent door 112 to prevent movement of the pressurization vent door 106 from the pressurization position to the depressurization position when a pressure differential (e.g., between an interior and exterior air pressure) meets a threshold. For example, if a pressure difference between an interior of the aircraft and an exterior of the aircraft meets a threshold, the pressurization vent door 106 may be locked by the locking vent door 112 to prevent rapid depressurization of a cabin of the aircraft. Doing so can enhance safety while also facilitating design. In this example, the pressurization vent door 106 is in the pressurization position.

The pressurization vent door 106 is releasably connected with a hook or catch 108. The hook or catch 108 is movable between a locking position to engage with the pressurization vent door 106 to lock the pressurization vent door 106 into the pressurization position, and an unlocking position to unlock the pressurization vent door 106 to allow the pressurization vent door 106 to move into the depressurization position. For example, the hook or catch 108 can form a groove that a portion of the pressurization vent door 106 is disposed within when the hook or catch 108 is in the locking position and the pressurization vent door 106 is in the pressurization position. In doing so, the hook or catch 108 is secured to the pressurization vent door 106 to prevent the pressurization vent door 106 from moving to the depressurization position. When the hook or catch 108 is moved from the locking position to the unlocking position (e.g., rotated upward) the hook or catch 108 releases the pressurization vent door 106 so that the pressurization vent door 106 is free to move and open (e.g., rotates outwardly or inwardly) to the depressurization position. In the depressurization position, the depressurization vent is exposed so that air pressure inside the aircraft and outside the aircraft equalizes (i.e., depressurization of the aircraft cabin occurs).

The locking vent door 112 is configured to open inwardly towards an interior of the aircraft. For example, a top portion of the locking vent door 112 can rotate inwardly while a bottom portion of the locking vent door 112 remains fixed so that the top portion rotates around the bottom portion. The locking vent door 112 can be firmly held in the closing position (e.g., a close position) by an air pressure inside the aircraft. For example, if the interior air pressure inside the aircraft is greater than an exterior air pressure of the aircraft, the locking vent door 112 can be firmly held and/or biased in the closing position. Thus, if the interior air pressure is significantly greater than the exterior air pressure (e.g., the pressure difference between the interior air pressure and the exterior air pressure meets a threshold), the locking vent door 112 cannot be moved into the opening position and remains in the closing position. In the closing position, the locking vent door 112 abuts a portion 110 of a shaft 122 of the handle 102, thus preventing downward rotation of the handle 102 along arrow 114 to prevent the handle 102 from moving into the disengaged position. That is, rotation of the handle 102 rotates the shaft 122. If the shaft 122 cannot rotate downward due to the portion 110 abutting the locking vent door 112, the handle 102 cannot rotate downward as well. Thus, when the locking vent door 112 is in the closing position, the handle 102 is secured in the engaged position so that the hook or catch 108 is in the locking position and the handle 102 is prevented from moving into the disengaged position. When the locking vent door 112 is in the opening position, the handle 102 is moveable to a disengaged position.

In some examples, the aircraft pressurization system 118 includes a cover 120 attached to the locking vent door 112. The cover 120 covers several elements, including the handle 102, the shaft 122, the portion 110 and the locking vent door 112. The cover 120 is removed when the handle is pulled to open the door. For example, the cover 120 is coupled with the locking vent door 112 so that movement of the cover 120 moves the locking vent door 112 between the opening position and the closing position. As noted above, in some examples the locking vent door 112 cannot be moved from the opening position to the closing position when the pressure difference between the interior air pressure and the exterior air pressure meets the threshold. In such examples, the cover 120 cannot be moved since the locking vent door 112 cannot be moved, thus inhibiting movement of the cover 120. As discussed below, doing so prohibits the handle 102 from moving and the pressurization vent door 106 cannot be moved into the depressurization position.

If a pressure difference does not meet the threshold, the locking vent door 112 is moveable (e.g., can be moved from the closing position to the opening position). The cover 120 can be thus moved to expose the handle 102, locking vent door 112, portion 110, shaft 122 and the pressurization vent door 106. Furthermore, movement of the cover 120 rotates the locking vent door 112 to the opening position due to interconnections 142 between the cover 120 and the locking vent door 112. The interconnection 142 is a flexible link that runs from the center of the cover 120 to the top of the locking vent door 112 that when pulled, causes the locking vent door 112 to rotate along a lower hinge line of the locking vent door 112. If the locking vent door 112 is unable to be opened due the pressure difference, the cover 120 cannot be moved. When the locking vent door 112 rotates to the opening position (e.g., opens inwardly towards an interior of the aircraft) based on the cover 120 moving, the locking vent door 112 no longer abuts the portion 110 of the shaft 122 of the handle 102.

Since the portion 110 of the shaft 122 no longer abuts the locking vent door 112, the handle 102 is no longer locked in place and can be freely moved to the disengaged position from the engaged position. The handle 102 can be manually rotated. When the handle 102 moves into the disengaged position, cranks 124 are rotated to move the hook or catch 108 into the opening position (e.g., unlocking position), permitting the pressurization vent door 106 to automatically open due to the pressure difference and equalize the interior air pressure and the exterior air pressure. Thus, the handle 102 controls the hook or catch 108.

When the handle 102 is moved from the current illustrated engaged position to the disengaged position (e.g., downward) along arrow 114, the handle 102 moves (e.g., rotates) the hook or catch 108 into the unlocking position to unlock the pressurization vent door 106 from the hook or catch 108. When the pressurization vent door 106 is unlocked, the pressurization vent door 106 can move into the depressurization position under the influence of the pressure difference. That is, the pressurization vent door 106 rotates towards an outside of the aircraft and is pushed open by the internal air pressure. Since the external air pressure is less than the internal air pressure, the internal pressure is able to move the pressurization vent door 106 to the open position. For example, on landing the above operations can be executed to open the pressurization vent door 106 and equalize pressure.

In this example, the locking vent door 112 will rotate downward pulled open by removing the cover 120 over the locking vent door 112. If the internal pressure is too high, the cover 120 will not be removed and the handle 102 will remain locked out to avoid depressurization when the pressure difference is significantly high. In some examples, a spring or small latch can be added to a hinge line of the locking vent door 112 to tune a value of the pressure difference that will permit opening of the locking vent door 112, and thus when the hook or catch 108 will be disengaged. The spring or small latch can also hold the hook or catch 108 closed once the hook or catch 108 is in the locking position. In some examples and depending on the configuration and loads, an additional feature to hold the locking vent door 112 open until the locking vent door 112 is manually closed is possible.

The positions of the pressurization vent door 106 and the locking vent door 112 are flexible as well. For example, in some examples the locking vent door 112 and the pressurization vent door 106 can be located off the aircraft door 100 in a sidewall of the aircraft that supports the aircraft door 100. In some examples, the pressurization vent door 106 can be located beneath the illustrated window in areas that typically would not be able to accommodate the pressurization vent door 106 since the pressurization vent door 106 opens outwardly.

Figure 2A:
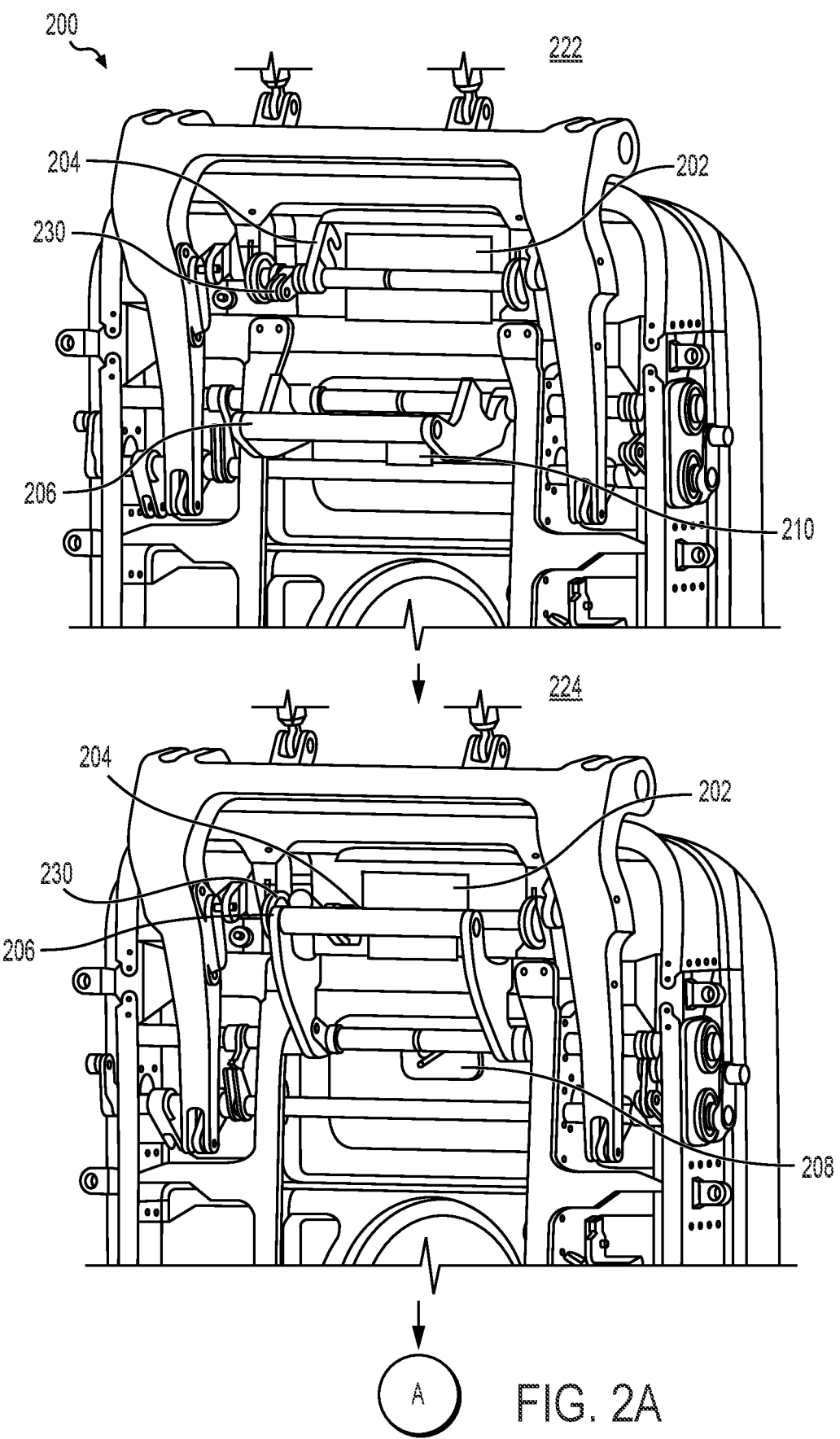
FIG. 2A-2B are illustrations of a process to close an aircraft door and enable pressurization in an aircraft.
Figure 2B:
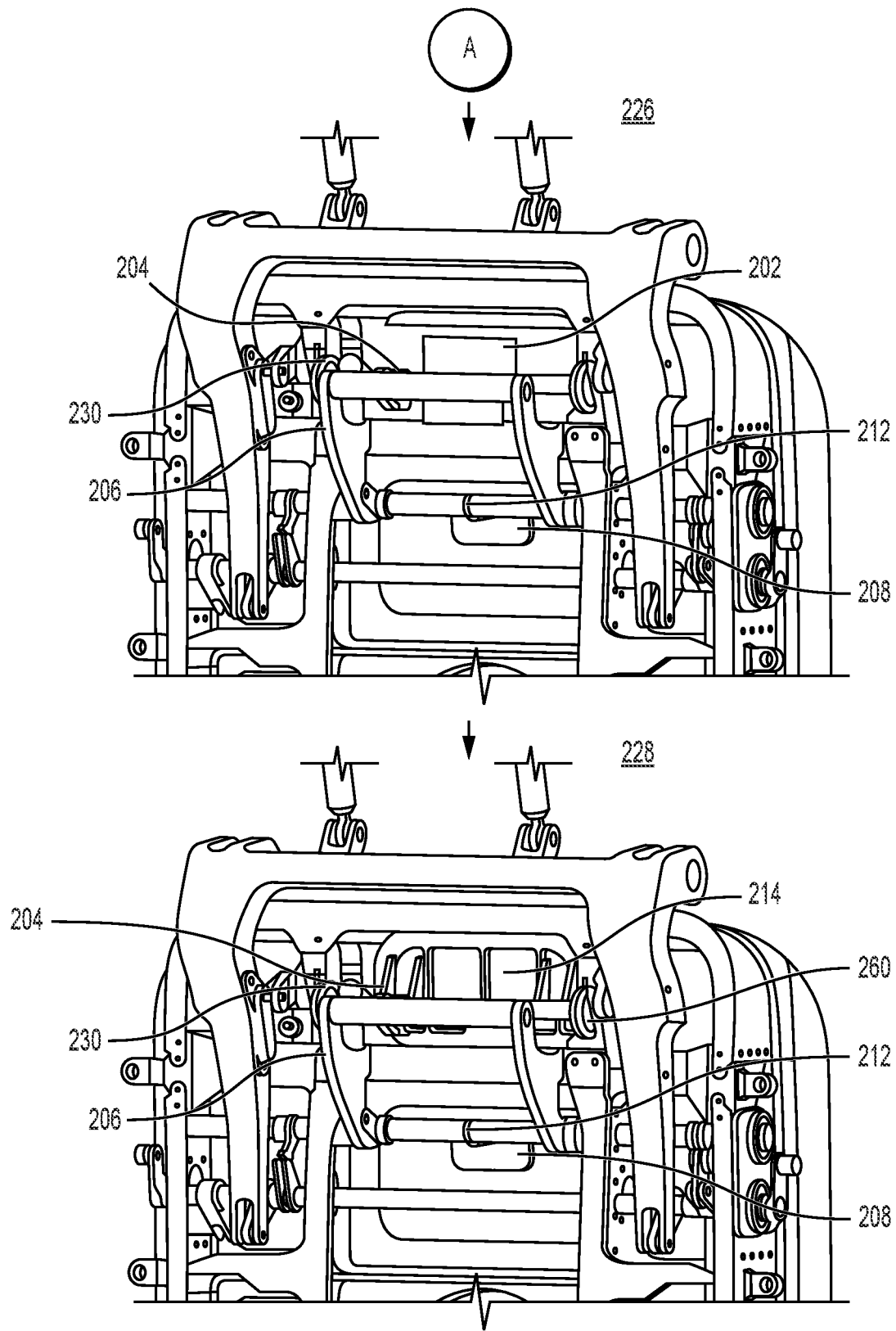

FIGS. 2A-2B illustrates a process 200 to close an aircraft door and enable pressurization in an aircraft. The process 200 is generally implemented by any of the examples described herein and can be applied to for example the aircraft door 100 (FIG. 1).

In a first portion 222 of the process 200, a locking vent door 208 is in an opening position and is thus not visible. Rather, a lockout vent 210 is illustrated that the locking vent door 208 will cover (explained below). A hook or catch 204 is further in an unlocking position. A handle 206 is in a disengaged position. A pressurization vent door 214 (not yet illustrated) is in a depressurization position to open a depressurization vent 202 to depressurize the aircraft.

In a second portion 224 of the process 200, the locking vent door 208 is moved towards a closing position to cover the lockout vent 210. The handle 206 is moved towards the locking position to rotate the cranks 230 into a closed position and position the hook or catch 204 into a locking position. Thus, the handle 206 is rotated to an engaged position (e.g., a close latched and locked position).

Turning now to FIG. 2B, in a third portion 226 of the process 200 is illustrated. In FIG. 2B, the handle 206 is closed to abut against the locking vent door 208 (e.g., form a lower handle pressure lock). For example, a portion 212 of the handle 206 abuts against the locking vent door 208. The locking vent door 208 is now in the closing position and the handle 206 is in the engaged position.

In a fourth portion 228 of the process 200, pins 260 are removed from the pressurization vent door 214 to allow the locking vent door 208 to move to the closing position (e.g., locking position). The pressurization vent door 214 is closed, covering and sealing the depressurization vent 202. The pins are then inserted into the pressurization vent door 214 and hook or catch 204 locks the pressurization vent door 214 into a pressurization position (e.g., a closed position). At this time, a handle cover (not illustrated) can also be replaced and coupled with the locking vent door 208.

Figure 3A:
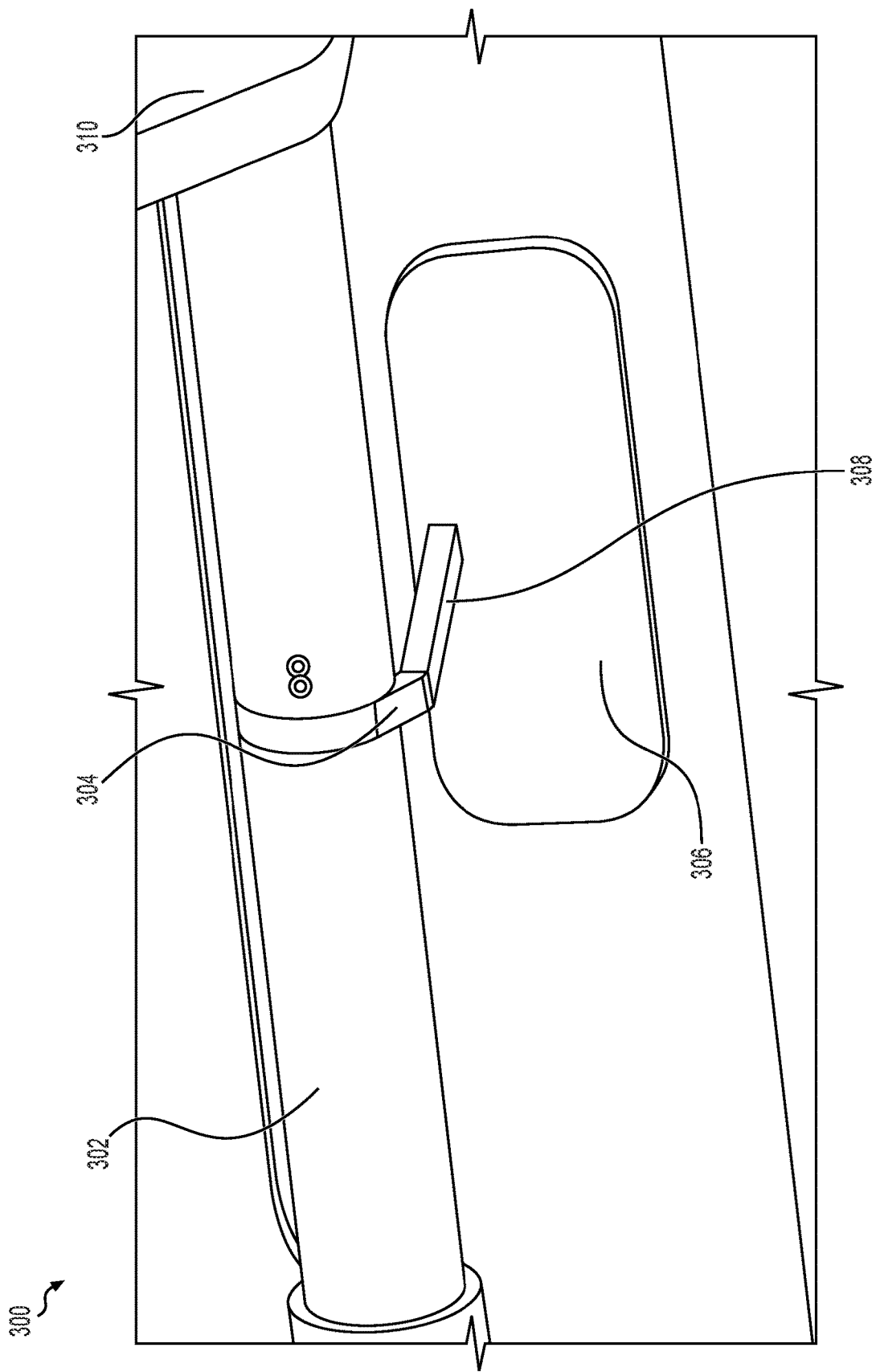
FIGS. 3A-3C are an illustrations of a pressure locking system.
Figure 3B:
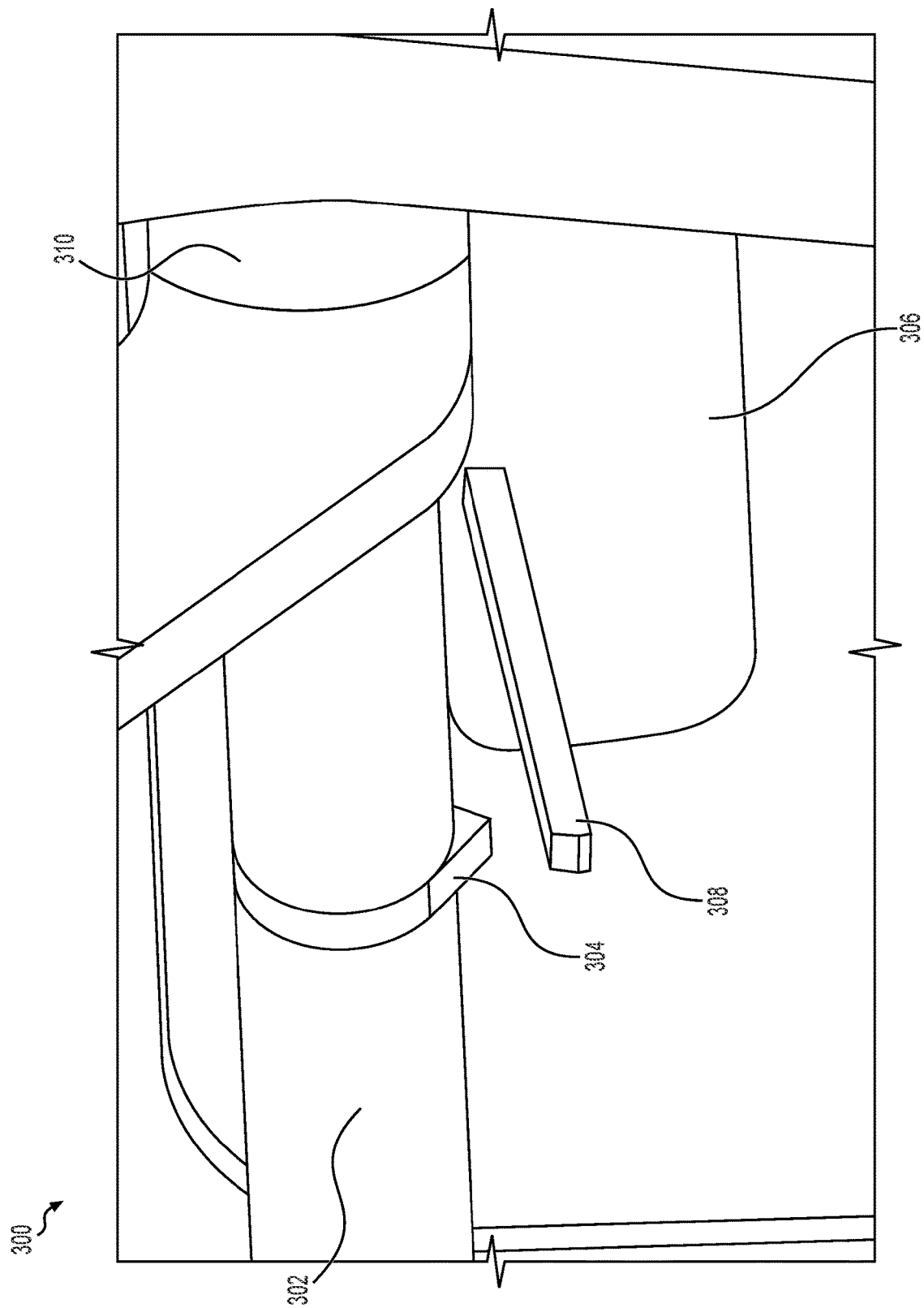
Figure 3C:
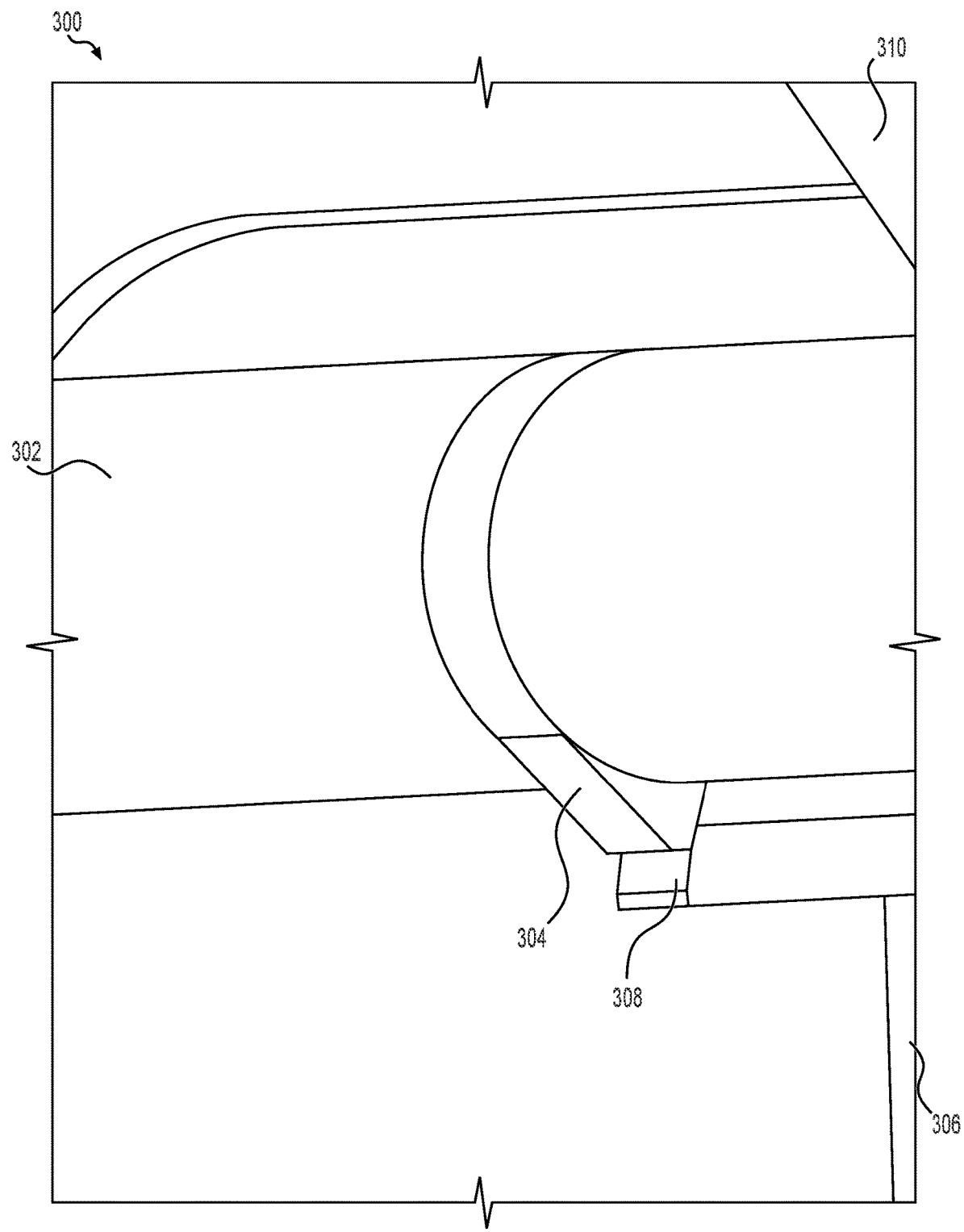

FIGS. 3A-3C illustrates a pressure locking system 300. The pressure locking system 300 is generally implemented by any of the examples described herein and can be applied to for example the aircraft door 100 (FIG. 1) and/or in conjunction with the process 200. The pressure locking system 300 may be readily substituted for the portion 110 of the shaft 122 of the handle 102, and the locking vent door 112 (FIG. 1).

FIG. 3A illustrates a locked state of the pressure locking system 300. A locking vent door 306 includes a first protrusion 308. A shaft 302 of a handle 310 includes a second protrusion 304 that interlocks with the first protrusion 308. In some examples, when a pressure difference between an internal air pressure internal to the aircraft and an external air pressure external to the aircraft meets a threshold, the locking vent door 306 is held firmly into a closed position as illustrated, and the first and second protrusions 308, 304 form a shear lock to hold the handle 310 firmly in place (e.g., handle 310 cannot be rotated downward) and a cover (not illustrated) covering the handle 310. If the internal pressure is too high, a cover will not be able to be removed and the handle 310 will remain locked out. A pressurization vent door will be physically locked out if the locking vent door 306 is closed, the handle 310 shaft will bear on to the lock out feature preventing rotation of the handle 310 and the pressurization vent door. Most door vents are considered locked when the handle force to open is above approximately 300 lbs, but may not be locked out by a shear or bearing connection.

FIG. 3B illustrated an unlocked state of the pressure locking system 300. When the pressure difference does not meet the threshold, the locking vent door 306 can rotate downward pulled open by removing a cover (not illustrated) covering the handle 310. The first and second protrusions 308, 304 no longer abut each other to disengage the shear lock. The cover can be removed to open the locking vent door 306 and place the locking vent door 306 into an opening position. The handle 310 can now be rotated to open a pressurization vent door as discussed above. In some examples, a spring or small latch can be added to a hinge line of the locking vent door 306 to tune at what pressure a lock locking the pressurization vent door will be disengaged, and also hold the pressurization vent door closed once the lock and pressurization vent door are in proper positions. In some embodiments, depending on the configuration and loads, an additional feature to lock the locking vent door 306 open until the locking vent door 306 is manually closed is implemented.

FIG. 3C illustrates an intermediary state between a locked state of the pressure locking system 300 (FIG. 3A) and an unlocked state of the pressure locking system 300 (FIG. 3B). As illustrated, the first and second protrusions 308, 304 can move relative to each other.

Figure 4A:
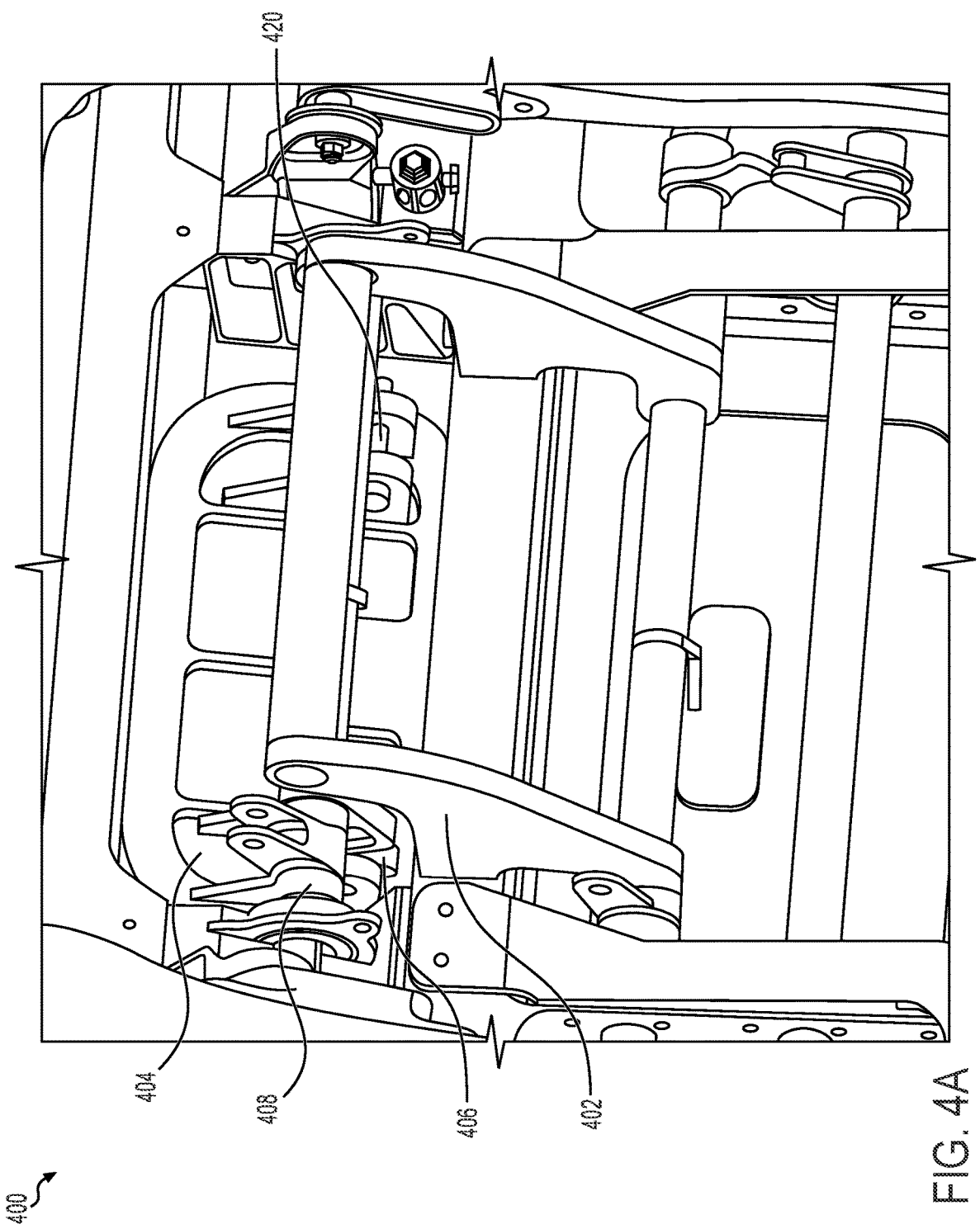
FIGS. 4A-4B is an illustration of a pressure regulation system.
Figure 4B:
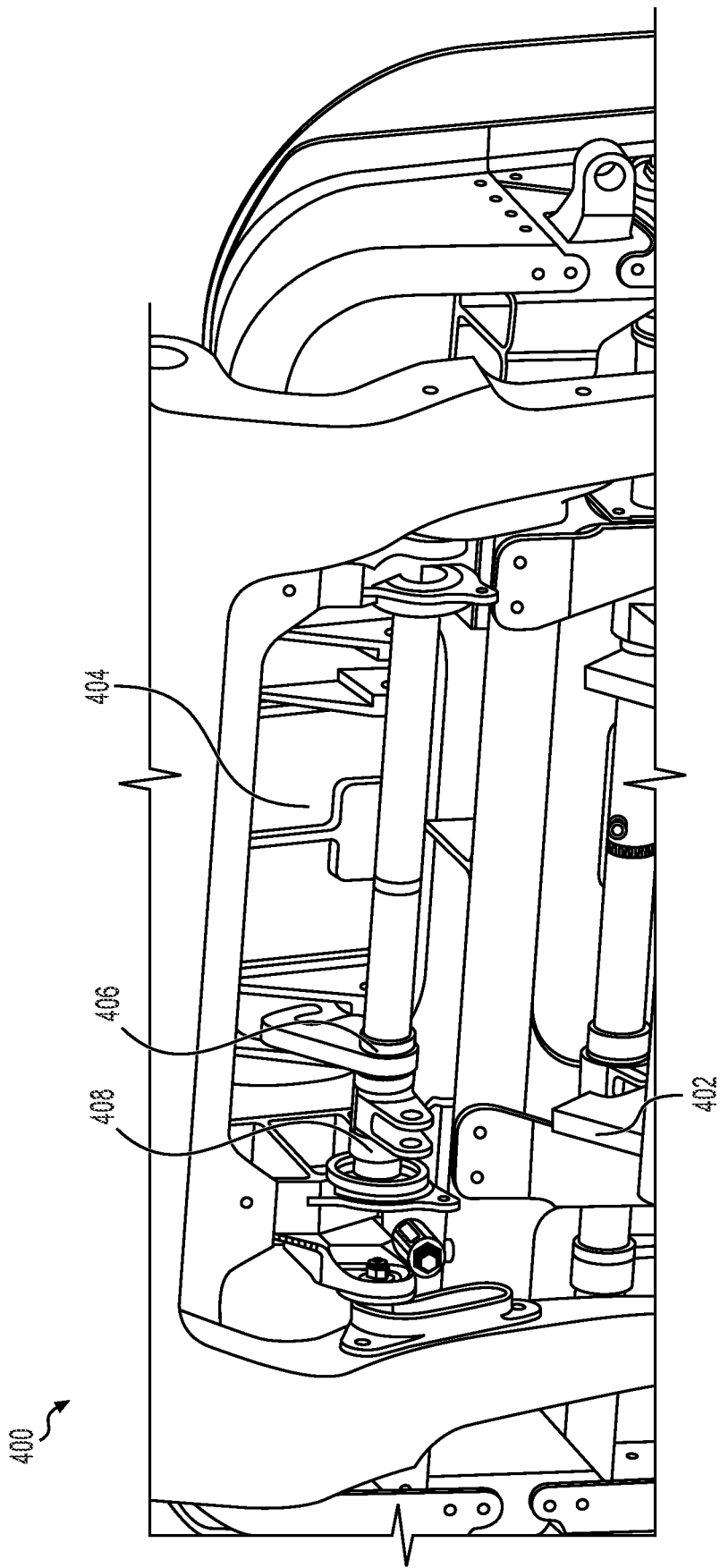

FIGS. 4A-4B illustrate a pressure regulation system 400. The pressure regulation system 400 is generally implemented by any of the examples described herein and can be applied to for example the aircraft door 100 (FIG. 1), in conjunction with the process 200 and/or in conjunction with the pressure locking system 300 (FIGS. 3A-3C).

As illustrated in FIG. 4A, a handle 402 is connected with a hook or catch 406 via crank 408. The hook or catch 406 locks the pressurization vent door 404. When the handle 402 rotates to open the pressurization vent door 404, the handle 402 direct drives the hook or catch 406 through the crank 408 releasing the pressurization vent door 404 (e.g., an outwardly opening vent), allowing the pressurization vent door 404 to rotate open freely. The pressurization vent door 404 will be spring loaded open. Removeable pins 420 are also illustrated to close the pressurization vent door 404.

The pressurization vent door 404 will stay open until manually closed. Doing so prevents pressurization of an aircraft and provides a required sequencing. The pressurization vent door 404 (e.g., a means to prevent pressurization) cannot be closed until the door is closed, latched, and locked by means of the latches of the hook or catch 406 are in place on the pressurization vent door 404 to secure the pressurization vent door 404 closed in a pressurization position.

During closing of the pressurization vent door 404, a pin on the pressurization vent door 404 will be removed then replaced latching the pressurization vent door 404 in the pressurization position (e.g., the hooks will be in the closed position)

In some examples, to facilitate ice breaking, the hook or catch 406 can have added kicker(s) to aid in biasing the pressurization vent door 404 open. In some examples, a spring force of the pressurization vent door 404 can be tuned to provide enough opening force to overcome restraining elements such as ice. In examples, a combination of the added kickers and spring force can be used.

FIG. 4B illustrates an example where the handle 402 is in the disengaged position. The hook or catch 406 has released the pressurization vent door 404 and is able to freely move into the depressurization position to depressurize the aircraft.

FIGS. 5A-5D illustrate a modified aircraft pressurization system 500. FIGS. 5A-5D is generally implemented by any of the examples described herein and can be applied to for example the aircraft door 100 (FIG. 1), in conjunction with the process 200 and/or in conjunction with the pressure locking system 300 (FIGS. 3A-3C), and/or in conjunction with pressure regulation system 400 (FIGS. 4A-4B).

The modified aircraft pressurization system 500 has a same function as the aircraft pressurization system 118 (FIG. 1), but a locking vent door 504 is positioned in the pressurization vent door 502 and locks out a shaft 508 (e.g., a connection mechanism) of a hook or catch 506 rather locking a shaft of a handle 510 directly. In this example, a shear lock is formed between the shaft 508 and the locking vent door 504. Thus, the locking vent door 504 is pressed into a locked position when a pressure difference between an internal air pressure of an aircraft and an external air pressure of the aircraft meets a threshold. When the locking vent door 504 is in the closed position, the locking vent door 504 abuts against a portion of the shaft 508 to form the shear lock and prevent rotation of the hook or catch 506 as well as the handle 510.

Figure 5A:
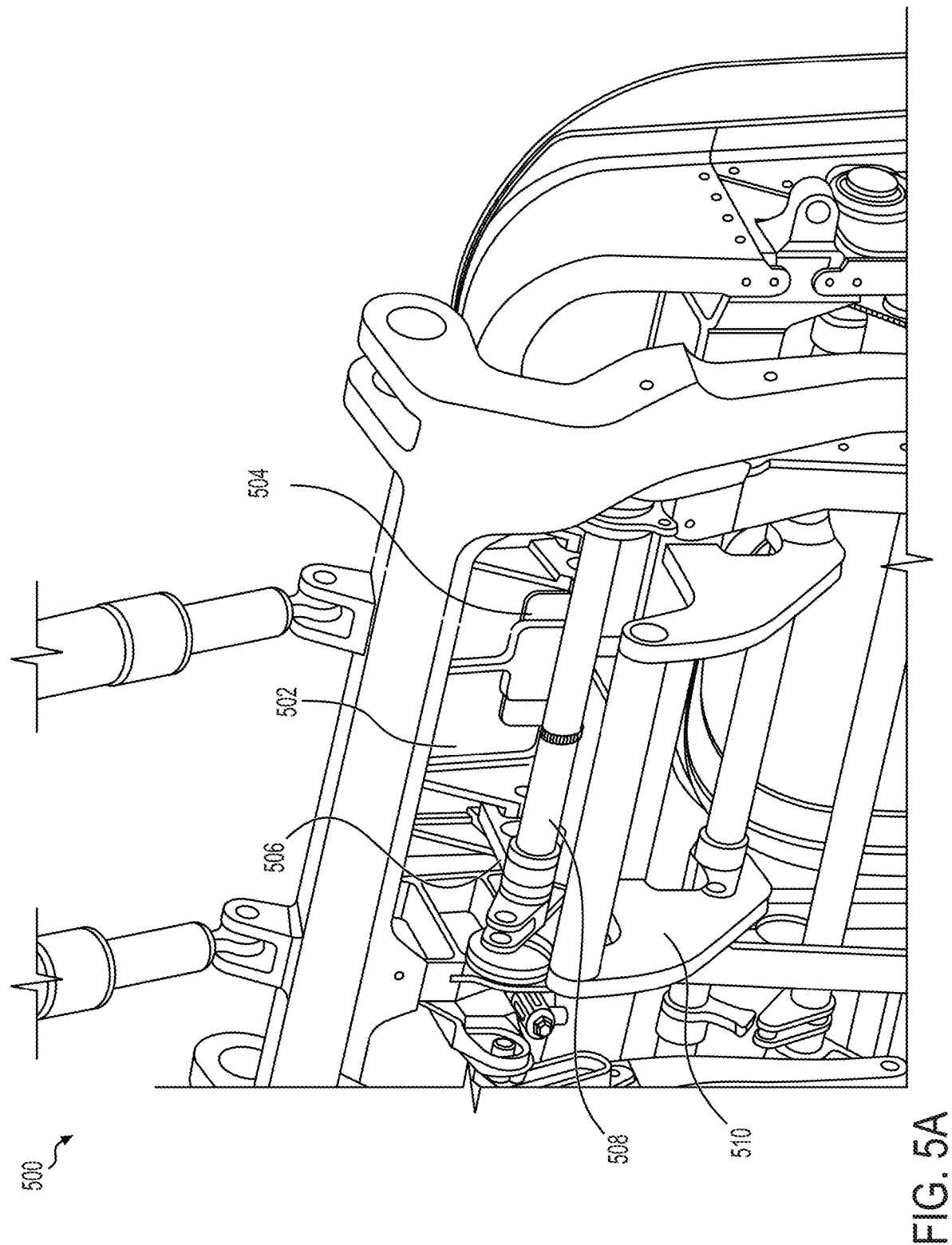
FIGS. 5A-5D are an illustration of a modified aircraft pressurization system.
Figure 5B:
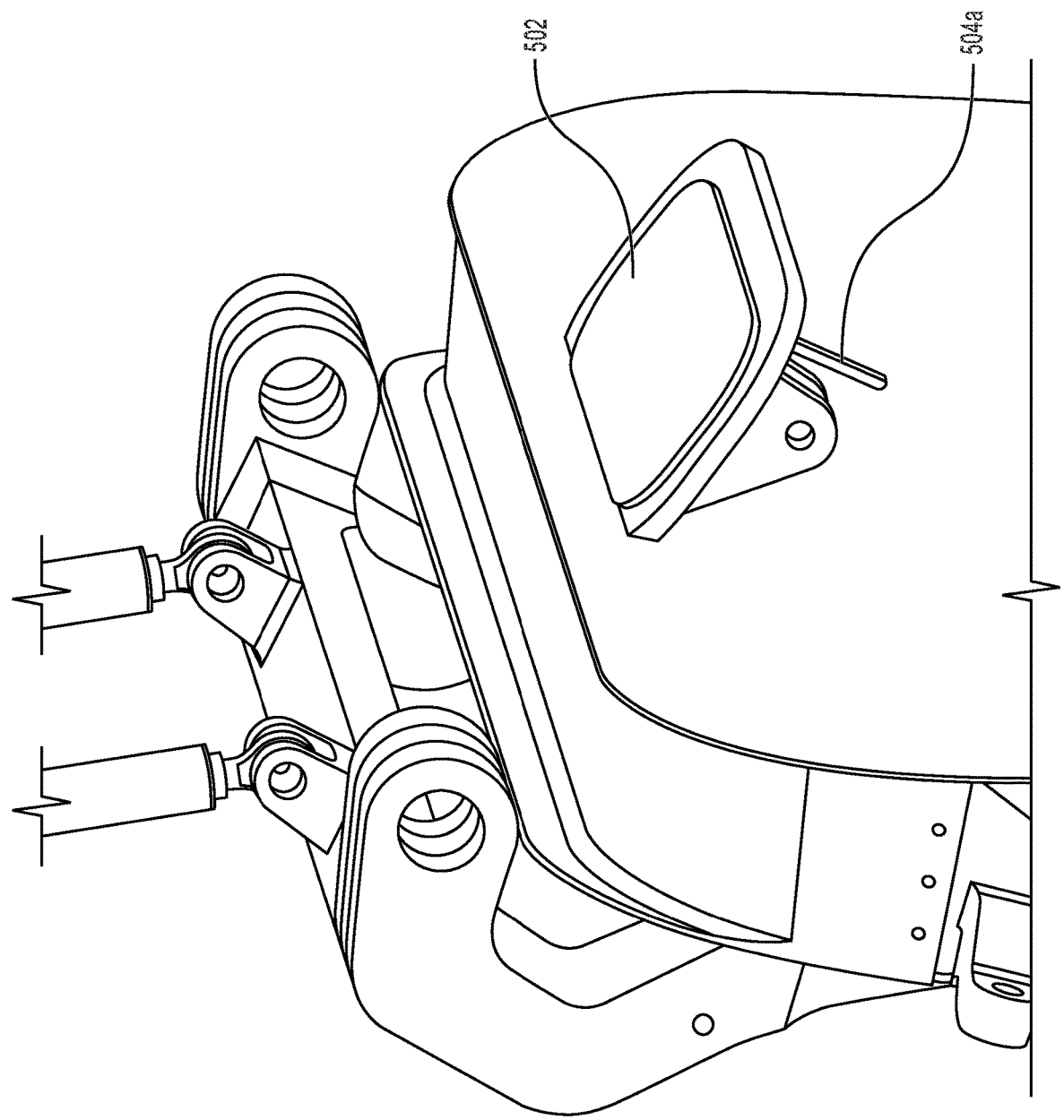

As illustrated in FIG. 5B, when the pressure difference fails to meet the threshold, the locking vent door 504 can be moved into an opening position to disengage the shear lock, thereby permitting the pressurization vent door 502 to move into the depressurization position from the pressurization position. The shaft 508 may then be rotated allowing the hook or catch 506 to rotate. The pressurization vent door 502 is then rotatable into a depressurization position to depressurize the aircraft. The locking vent door 504 rotates with the pressurization vent door 502. A protrusion 504a of the locking vent door 504 is illustrated. The protrusion can form part of the shear lock and abuts the shaft 508 to lock the shaft 508 into place and prevent rotation of the shaft 508.

Figure 5C:
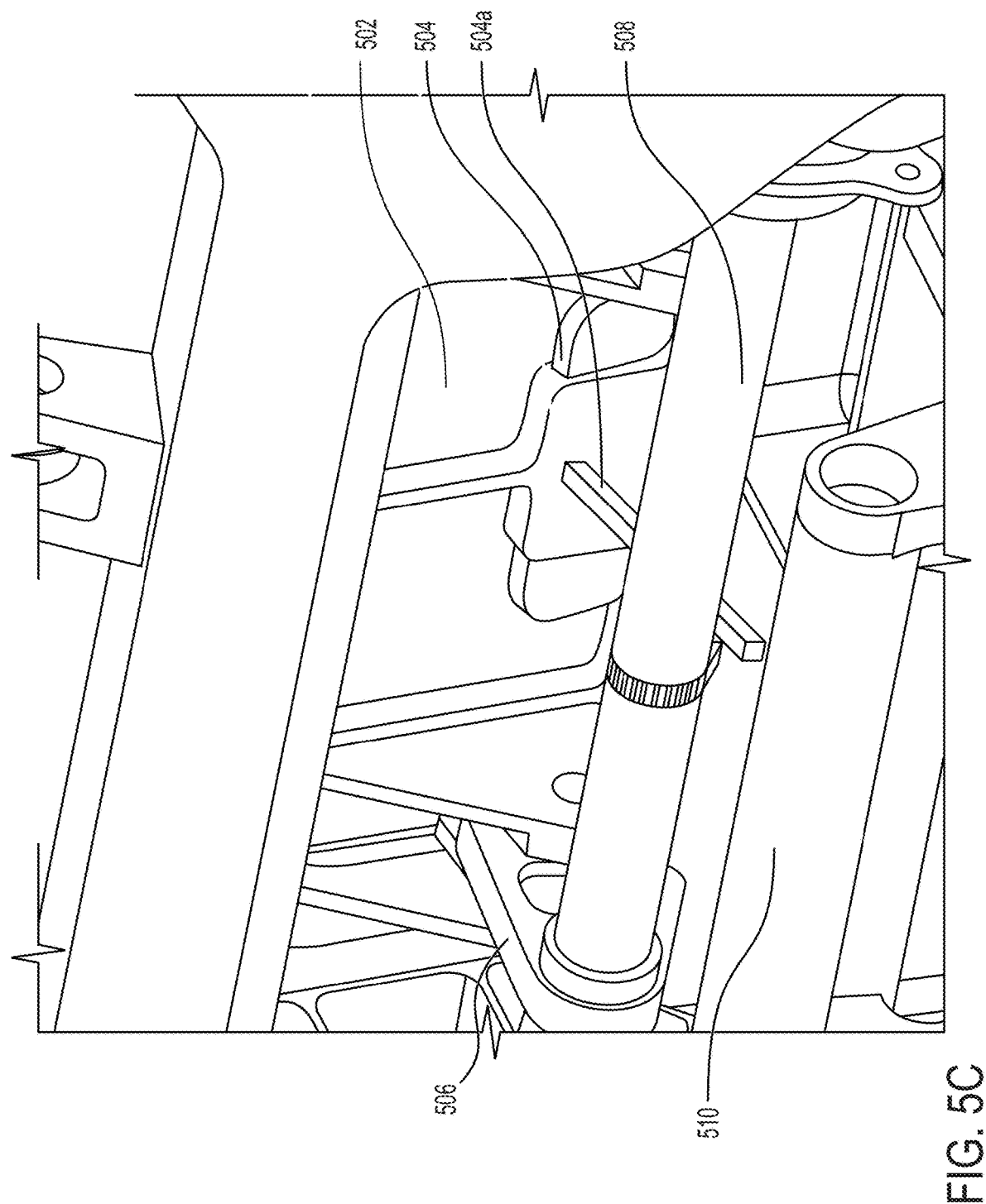

FIG. 5C illustrates when the pressure difference fails to meet the threshold, and the shear lock is initially disengaged. The protrusion 504a disengages the shaft 508. At this time, the handle 510 can be freely rotated to a disengaged position. When the handle 510 moves to the disengaged position, the hook or catch 506 can be rotated to the unlocking position to permit the pressurization vent door 502 to open into the depressurization position.

Figure 5D:
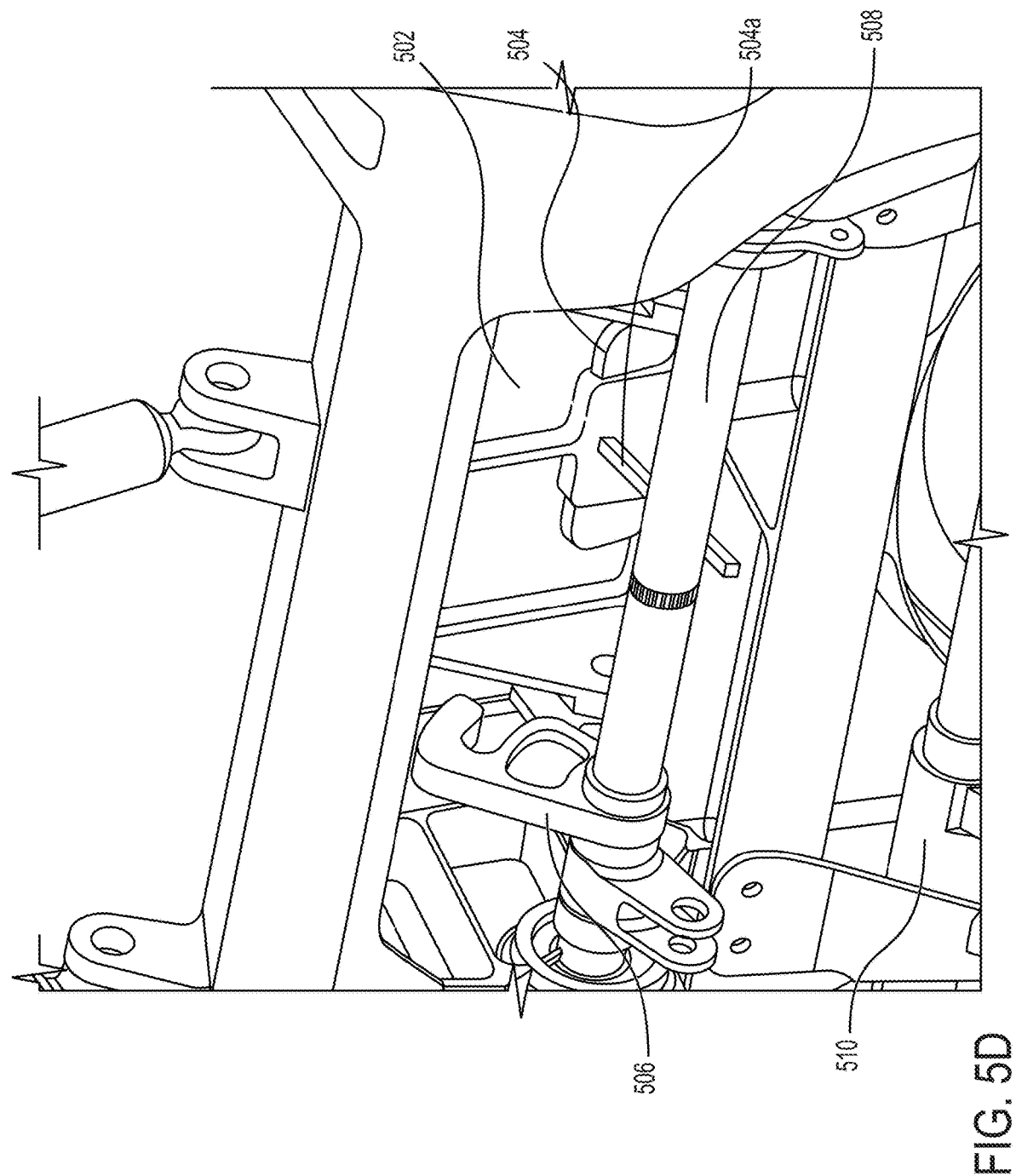

FIG. 5D illustrates when the shear lock is disengaged and the handle 510 is rotated to the disengaged position. When the handle 510 moves to the disengaged position, the hook or catch 506 is rotated to the unlocking position to permit the pressurization vent door 502 to open into the depressurization position.

Figure 6:
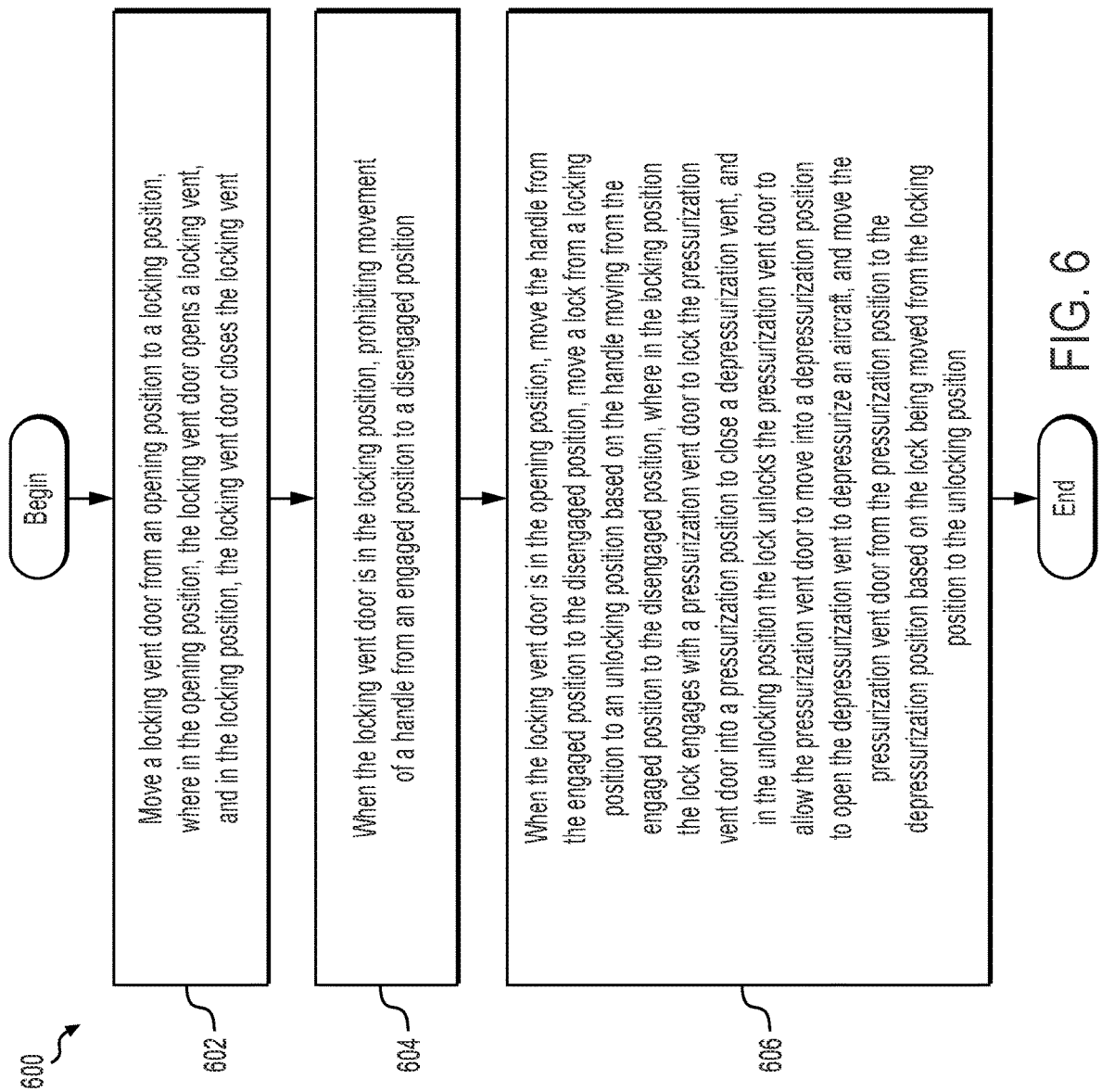
FIG. 6 is an illustration of a method of controlling pressurization and depressurization of an aircraft.

FIG. 6 shows a method 600 of controlling pressurization and depressurization of an aircraft. The method 600 is generally implemented by any of the examples described herein, for example, the aircraft door 100 (FIG. 1), in conjunction with the process 200 and/or in conjunction with the pressure locking system 300 (FIGS. 3A-3C), in conjunction with pressure regulation system 400 (FIGS. 4A-4B), and/or modified aircraft pressurization system 500 (FIGS. 5A-5D). Some embodiments may include some electrical monitoring.

Illustrated processing block 602 moves a locking vent door from an opening position to a closing position, where in the opening position, the locking vent door opens a lockout vent, and in the closing position, the locking vent door closes the locking vent. When the locking vent door is in the closing position, illustrated processing block 604 prohibits movement of a handle from an engaged position to a disengaged position.

When the locking vent door is in the opening position illustrated processing block 606 moves the handle from the engaged position to the disengaged position. Further, processing block 606 moves a lock from a locking position to an unlocking position based on the handle moving from the engaged position to the disengaged position, where in the locking position the lock engages with a pressurization vent door to lock the pressurization vent door into a pressurization position to close a depressurization vent, and in the unlocking position the lock unlocks the pressurization vent door to allow the pressurization vent door to move into a depressurization position to open the depressurization vent to depressurize an aircraft. Further, processing block 606 moves the pressurization vent door from the pressurization position to the depressurization position based on the lock being moved from the locking position to the unlocking position.

Further, the disclosure comprises additional examples as detailed in the following clauses below.

Clause 1. An aircraft comprising:
a pressurization vent door that is moveable between a pressurization position to close a depressurization vent to allow the aircraft to be pressurized, and a depressurization position to open the depressurization vent to depressurize the aircraft;
a locking vent door that when moved to be open in an opening position opens a lockout vent, and when moved to be closed in a closing position closes the lockout vent; and
a handle that controls the pressurization vent door and is moveable to an engaged position to control the pressurization vent door to be in the pressurization position, and a disengaged position to control the pressurization vent door to be in the depressurization position, the handle being releasably connected with the locking vent door,
wherein the handle is releasably connected with the locking vent door so that:
when the locking vent door is in the closing position, the handle is secured in the engaged position so that the handle is prevented from moving into the disengaged position, and when the locking vent door is in the opening position, the handle is moveable to the disengaged position to permit the pressurization vent door to be in the depressurization position.

Clause 2. The aircraft of Clause 1, wherein:
an exterior air pressure is applied to the locking vent door from an exterior of the aircraft,
an interior air pressure is applied to the locking vent door from an interior of the aircraft, and
the locking vent door is prevented from being moved from the closing position when a pressure difference between the interior air pressure and the exterior air pressure meets a threshold.

Clause 3. The aircraft of Clause 1, further comprising a cover coupled with the locking vent door so that movement of the cover moves the locking vent door between the opening position and the closing position.

Clause 4. The aircraft of Clause 1, further comprising a protrusion on the locking vent door and that forms a shear lock with the handle to prevent the handle from moving to the disengaged position when the locking vent door is in the closing position.

Clause 5. The aircraft of Clause 1, wherein the opening position and the closing position of the locking vent door are located within an interior of the aircraft.

Clause 6. The aircraft of Clause 1, wherein the locking vent door is positioned away from the pressurization vent door Clause 7. The aircraft of Clause 1, further comprising:
a hook or catch movable between a locking position to engage with the pressurization vent door to lock the pressurization vent door into the pressurization position, and an unlocking position to unlock the pressurization vent door to allow the pressurization vent door to move into the depressurization position,
wherein when the locking vent door is in the closing position, the handle is secured in the engaged position so that the hook or catch is in the locking position and the handle is prevented from moving into the disengaged position, and
further wherein when the locking vent door is in the opening position, the handle is moveable to the disengaged position to move the hook or catch into the unlocking position.

Clause 8. The aircraft of Clause 1, wherein the pressurization vent door rotates towards an interior of the aircraft or towards an exterior of the aircraft.

Clause 9. The aircraft of Clause 1, further comprising:
an aircraft door that is moveable to a first position to permit a user to enter or exit the aircraft, and a second position to seal the aircraft and disallow the user from entering or exiting the aircraft; and
a sidewall that supports the aircraft door;
wherein one or more of the pressurization vent door or the locking vent door are disposed in the sidewall at a position away from the aircraft door.

Clause 10. The aircraft of Clause 1, wherein the locking vent door is positioned in the pressurization vent door.

Clause 11. A method comprising:
moving a locking vent door from an opening position to a closing position, wherein in the opening position, the locking vent door opens a lockout vent, and in the closing position, the locking vent door closes the lockout vent;
when the locking vent door is in the closing position, prohibiting movement of a handle from an engaged position to a disengaged position; and
when the locking vent door is in the opening position, moving the handle from the engaged position to the disengaged position to permit a pressurization vent door to be in a depressurization position; and
moving the pressurization vent door from a pressurization position to the depressurization position based on the handle being moved from the engaged position to the disengaged position, wherein in the pressurization position the pressurization vent door closes a depressurization vent, and in the depressurization position the pressurization vent door opens the depressurization vent to depressurize an aircraft.

Clause 12. The method of Clause 11, further comprising:
preventing movement of the locking vent door from the closing position when a pressure difference between an interior air pressure and an exterior air pressure meets a threshold,
wherein the exterior air pressure is applied to the locking vent door from an exterior of the aircraft,
wherein the interior air pressure is applied to the locking vent door from an interior of the aircraft.

Clause 13. The method of Clause 11, further comprising:
moving a cover coupled to the locking vent door so that movement of the cover moves the locking vent door between the opening position and the closing position.

Clause 14. The method of Clause 11, further comprising:
forming, with a protrusion of the locking vent door, a shear lock with the handle to prevent the handle from moving to the disengaged position when the locking vent door is in the closing position.

Clause 15. The method of Clause 11, wherein the opening position and the closing position of the locking vent door are located within an interior of the aircraft.

Clause 16. The method of Clause 11, wherein the locking vent door is positioned away from the pressurization vent door Clause 17. The method of Clause 11, further comprising:
moving a hook or catch from a locking position to an unlocking position based on the handle moving from the engaged position to the disengaged position, wherein in the locking position the hook or catch engages with the pressurization vent door to lock the pressurization vent door into the pressurization position and in the unlocking position the hook or catch unlocks the pressurization vent door to allow the pressurization vent door to move into the depressurization position.

Clause 18. The method of Clause 11, wherein the pressurization vent door rotates towards an interior of the aircraft or towards an exterior of the aircraft.

Clause 19. The method of Clause 11, further comprising:
moving an aircraft door to a first position to permit a user to enter or exit the aircraft; and
moving the aircraft door to a second position to seal the aircraft and disallow the user from entering or exiting the aircraft,
wherein a sidewall that supports the aircraft door;
wherein one or more of the pressurization vent door or the locking vent door are disposed in the sidewall at a position away from the aircraft door.

Clause 20. The method of Clause 11, wherein the locking vent door is positioned in the pressurization vent door.

Clause 21. The aircraft of Clause 1, further comprising:
a connection mechanism to connect the handle and the locking vent door; and
a protrusion on the locking vent door that forms a shear lock with the connection mechanism to prevent the handle from moving to the disengaged position when the locking vent door is in the closing position.

Clause 22. The method of Clause 1, further comprising:
connecting the handle and the locking vent door with a connection mechanism connects; and
forming a shear lock with a protrusion on the locking vent door and the connection mechanism to prevent the handle from moving to the disengaged position when the locking vent door is in the closing position.

Example sizes/models/values/ranges can have been given, although examples are not limited to the same. Arrangements can be shown in block diagram form in order to avoid obscuring examples, and also in view of the fact that specifics with respect to implementation of such block diagram arrangements are highly dependent upon the computing system within which the example is to be implemented, i.e., such specifics should be well within purview of one skilled in the art. The term "coupled" can be used herein to refer to any type of relationship, direct or indirect, between the components in question, and can apply to electrical, mechanical, fluid, optical, electromagnetic, electromechanical, or other connections. In addition, the terms "first", "second", etc. can be used herein only to facilitate discussion, and carry no particular temporal or chronological significance unless otherwise indicated.

As used in this application and in the claims, a list of items joined by the term "one or more of" can mean any combination of the listed terms. For example, the phrases "one or more of A, B, or C" can mean A; B; C; A and B; A and C; B and C; or A, B, and C.

Those skilled in the art will appreciate from the foregoing description that the broad techniques of the examples can be implemented in a variety of forms. Therefore, while the examples have been described in connection with particular examples thereof, the true scope of the examples should not be so limited since other modifications will become apparent to the skilled practitioner upon a study of the drawings, specification, and following claims.

I claim:

1. An aircraft comprising:
a pressurization vent door that is moveable between a pressurization position to close a depressurization vent to allow the aircraft to be pressurized, and a depressurization position to open the depressurization vent to depressurize the aircraft;
a locking vent door that when moved to be open in an opening position opens a lockout vent, and when moved to be closed in a closing position closes the lockout vent, wherein the locking vent door is prevented from being moved from the closing position when a pressure difference between an interior air pressure and an exterior air pressure meets a threshold; and
a handle that controls the pressurization vent door and is moveable to an engaged position to control the pressurization vent door to be in the pressurization position, and a disengaged position to control the pressurization vent door to be in the depressurization position, the handle being releasably connected with the locking vent door,
wherein the handle is releasably connected with the locking vent door so that:
when the locking vent door is in the closing position, the handle is secured in the engaged position so that the handle is prevented from moving into the disengaged position, and
when the locking vent door is in the opening position, the handle is moveable to the disengaged position to permit the pressurization vent door to be in the depressurization position.

2. The aircraft of claim 1, wherein:
the exterior air pressure is applied to the locking vent door from an exterior of the aircraft, and
the interior air pressure is applied to the locking vent door from an interior of the aircraft.

3. The aircraft of claim 1, further comprising a cover coupled with the locking vent door so that movement of the cover moves the locking vent door between the opening position and the closing position.

4. The aircraft of claim 1, wherein the locking vent door includes a protrusion that forms a shear lock with the handle to prevent the handle from moving to the disengaged position when the locking vent door is in the closing position.

5. The aircraft of claim 1, wherein the opening position and the closing position of the locking vent door are located within an interior of the aircraft.

6. The aircraft of claim 1, wherein the locking vent door is positioned away from the pressurization vent door.

7. The aircraft of claim 1, further comprising:
a hook or catch movable between a locking position to engage with the pressurization vent door to lock the pressurization vent door into the pressurization position, and an unlocking position to unlock the pressurization vent door to allow the pressurization vent door to move into the depressurization position,
wherein when the locking vent door is in the closing position, the handle is secured in the engaged position so that the hook or catch is in the locking position and the handle is prevented from moving into the disengaged position, and
further wherein when the locking vent door is in the opening position, the handle is moveable to the disengaged position to move the hook or catch into the unlocking position.

8. The aircraft of claim 1, wherein the pressurization vent door rotates towards an interior of the aircraft or towards an exterior of the aircraft.

9. The aircraft of claim 1, further comprising:
an aircraft door that is moveable to a first position to permit a user to enter or exit the aircraft, and a second position to seal the aircraft and disallow the user from entering or exiting the aircraft; and
a sidewall that supports the aircraft door;
wherein one or more of the pressurization vent door or the locking vent door are disposed in the sidewall at a position away from the aircraft door.

10. An aircraft comprising:
a pressurization vent door that is moveable between a pressurization position to close a depressurization vent to allow the aircraft to be pressurized, and a depressurization position to open the depressurization vent to depressurize the aircraft;
a locking vent door that when moved to be open in an opening position opens a lockout vent, and when moved to be closed in a closing position closes the lockout vent; and
a handle that controls the pressurization vent door and is moveable to an engaged position to control the pressurization vent door to be in the pressurization position, and a disengaged position to control the pressurization vent door to be in the depressurization position, the handle being releasably connected with the locking vent door, wherein the handle is releasably connected with the locking vent door so that:
when the locking vent door is in the closing position, the handle is secured in the engaged position so that the handle is prevented from moving into the disengaged position, and
when the locking vent door is in the opening position, the handle is moveable to the disengaged position to permit the pressurization vent door to be in the depressurization position, and
wherein the locking vent door is positioned in the pressurization vent door.

11. A method comprising:
moving a locking vent door from an opening position to a closing position, wherein in the opening position, the locking vent door opens a lockout vent, and in the closing position, the locking vent door closes the lockout vent;
when the locking vent door is in the closing position, prohibiting movement of a handle from an engaged position to a disengaged position;
when the locking vent door is in the opening position,
moving the handle from the engaged position to the disengaged position to permit a pressurization vent door to be in a depressurization position; and
moving the pressurization vent door from a pressurization position to the depressurization position based on the handle being moved from the engaged position to the disengaged position, wherein in the pressurization position the pressurization vent door closes a depressurization vent, and in the depressurization position the pressurization vent door opens the depressurization vent to depressurize an aircraft; and
preventing movement of the locking vent door from the closing position when a pressure difference between an interior air pressure and an exterior air pressure meets a threshold.

12. The method of claim 11,
wherein the exterior air pressure is applied to the locking vent door from an exterior of the aircraft, and
wherein the interior air pressure is applied to the locking vent door from an interior of the aircraft.

13. The method of claim 11, further comprising:
moving a cover coupled to the locking vent door so that movement of the cover moves the locking vent door between the opening position and the closing position.

14. The method of claim 11, further comprising:
forming, with a protrusion of the locking vent door, a shear lock with the handle to prevent the handle from moving to the disengaged position when the locking vent door is in the closing position.

15. The method of claim 11, wherein the opening position and the closing position of the locking vent door are located within an interior of the aircraft.

16. The method of claim 11, wherein the locking vent door is positioned away from the pressurization vent door.

17. The method of claim 11, further comprising:
moving a hook or catch from a locking position to an unlocking position based on the handle moving from the engaged position to the disengaged position, wherein in the locking position the hook or catch engages with the pressurization vent door to lock the pressurization vent door into the pressurization position and in the unlocking position the hook or catch unlocks the pressurization vent door to allow the pressurization vent door to move into the depressurization position.

18. The method of claim 11, wherein the pressurization vent door rotates towards an interior of the aircraft or towards an exterior of the aircraft.

19. The method of claim 11, further comprising:
moving an aircraft door to a first position to permit a user to enter or exit the aircraft;
moving the aircraft door to a second position to seal the aircraft and disallow the user from entering or exiting the aircraft;
supporting the aircraft door with a sidewall; and
disposing one or more of the pressurization vent door or the locking vent door in the sidewall at a position away from the aircraft door.

20. The method of claim 11, wherein the locking vent door is positioned in the pressurization vent door.

* * * * *